US011692501B1

United States Patent
Kiwan et al.

(10) Patent No.: US 11,692,501 B1
(45) Date of Patent: Jul. 4, 2023

(54) METHODS AND SYSTEMS FOR FUEL INJECTOR BALANCING

(71) Applicant: Ford Global Technologies, LLC, Dearborn, MI (US)

(72) Inventors: Rani Kiwan, Canton, MI (US); Ross Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/647,281

(22) Filed: Jan. 6, 2022

(51) Int. Cl.
  *F02D 41/22* (2006.01)
  *F02D 41/24* (2006.01)

(52) U.S. Cl.
  CPC ........ *F02D 41/22* (2013.01); *F02D 41/2467* (2013.01); *F02D 2041/224* (2013.01); *F02D 2200/0602* (2013.01); *F02D 2200/0616* (2013.01)

(58) Field of Classification Search
  CPC ............... F02D 41/22; F02D 41/2467; F02D 2041/224; F02D 2200/0602; F02D 2200/0616
  See application file for complete search history.

(56) References Cited

U.S. PATENT DOCUMENTS

| 7,841,319 | B2* | 11/2010 | Thomas | F02D 41/401 |
| | | | | 123/478 |
| 8,676,476 | B2* | 3/2014 | Malikopoulos | F02D 41/1406 |
| | | | | 701/32.9 |
| 9,593,637 | B2* | 3/2017 | Surnilla | F02D 41/221 |
| 10,844,804 | B2 | 11/2020 | Pursifull et al. | |
| 10,989,132 | B2 | 4/2021 | Thomas et al. | |
| 11,274,623 | B1 | 3/2022 | Kiwan et al. | |
| 2018/0347494 | A1* | 12/2018 | Sanborn | F02D 41/221 |
| 2019/0234333 | A1* | 8/2019 | Sanborn | F02D 41/1454 |
| 2020/0116099 | A1* | 4/2020 | Surnilla | F02D 41/0085 |

OTHER PUBLICATIONS

Pursifull, R. et al., "Method and System for Operating a Fuel Injector," U.S. Appl. No. 17/240,165, filed Apr. 26, 2021, 34 pages.

* cited by examiner

*Primary Examiner* — Hung Q Nguyen
*Assistant Examiner* — Susan E Scharpf
(74) *Attorney, Agent, or Firm* — Vincent Mastrogiacomo; McCoy Russell LLP

(57) ABSTRACT

Methods and systems are provided for a fuel injector diagnostic. In one example, a method may include modifying an injection pattern to determine a relative fuel mass error of an injector. A fuel injector correction may be determined based the relative fuel mass error.

20 Claims, 5 Drawing Sheets

METHODS AND SYSTEMS FOR FUEL INJECTOR BALANCING

FIELD

The present description relates generally to methods and systems for adjusting a firing order for fuel injector balancing.

BACKGROUND/SUMMARY

Engines may be configured with direct fuel injectors (DI) for injecting fuel directly into an engine cylinder and/or port fuel injectors (PFI) for injecting fuel into an intake port of the engine cylinder. Fuel injectors may develop piece-to-piece variability over time due to imperfect manufacturing processes and/or injector aging, for example. Injector performance may degrade (e.g., injector becomes clogged) which may further increase piece-to-piece injector variability. Additionally or alternatively, injector to injector flow differences may lead to disparate fuel delivery between injectors. As a result, the actual amount of fuel injected to each cylinder of an engine may not be the desired amount and the difference between the actual and desired amounts may vary between injectors. Variability in a fuel injection amount between cylinders may result in reduced fuel economy, undesired tailpipe emissions, torque variation that causes a lack of perceived engine smoothness, and an overall decrease in engine efficiency. Engines operating with a dual injector system, such as dual fuel or PFDI systems, may have a higher number of fuel injectors resulting in greater possibility for injector variability. It may be desirable to balance the injectors so that all injectors have a similar error (e.g., all injectors at 1% under fueling).

Various approaches use fuel rail pressure drop across each injector to correct each injector's transfer function. One example approach is shown by Surnilla et al. in U.S. 2020/0116099. Therein, fuel rail pressure samples collected during a noisy zone of injector operation are discarded while samples collected during a quiet zone are averaged to determine an injector pressure. The injector pressure is then used to infer injection volume, injector error, and update an injector transfer function. Another example approach is shown by Surnilla et al. in U.S. Pat. No. 9,593,637. Therein, a fuel injection amount for an injector is determined based on a difference in fuel rail pressure (FRP) measured before injector firing and FRP after injector firing.

However, the inventors herein have recognized potential issues with such systems. As one example, variances in fuel rail pressures and fuel rail temperatures may affect a bulk modulus. An accuracy of diagnostics used to correct fueling errors may be reduced due to these variances.

One example approach to solve the above issues for enhanced pressure-based injector balancing (PBIB) is a method for computing a fuel injector correction based upon modifying injector command at a beginning and an end of a diagnostic and computing an average value at the beginning and the end of the diagnostic. The method further includes determining an average mass at a middle of the diagnostic using a rail pressure change and determining a relative fuel mass error for an individual injector. In this way, the fuel injector correction may be quickly determined.

For example, the injections during the diagnostic may span a range of fuel rail pressures (FRPs). The average determined at the beginning of the diagnostic may include a relatively high FRP and the average determined at the end of the diagnostic may include a relatively low FRP. By doing this, the impact of varying FRP may be ignored by determining the average fuel mass of the plurality of injectors at the beginning and end of the diagnostic and the average mass of the individual injector at the middle of the diagnostic.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
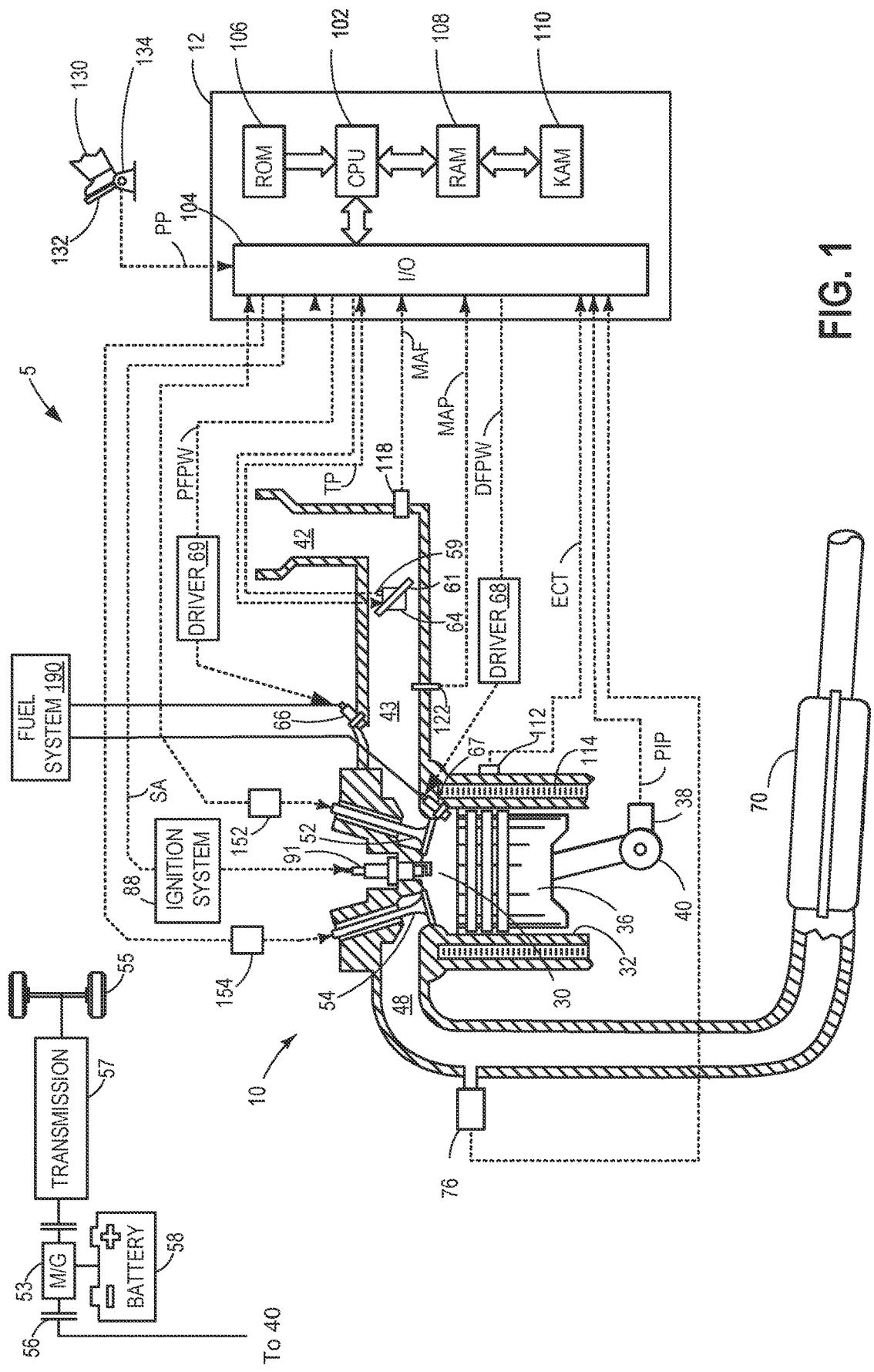
FIG. 1 shows a schematic depiction of an example propulsion system including an engine.
Figure 2:
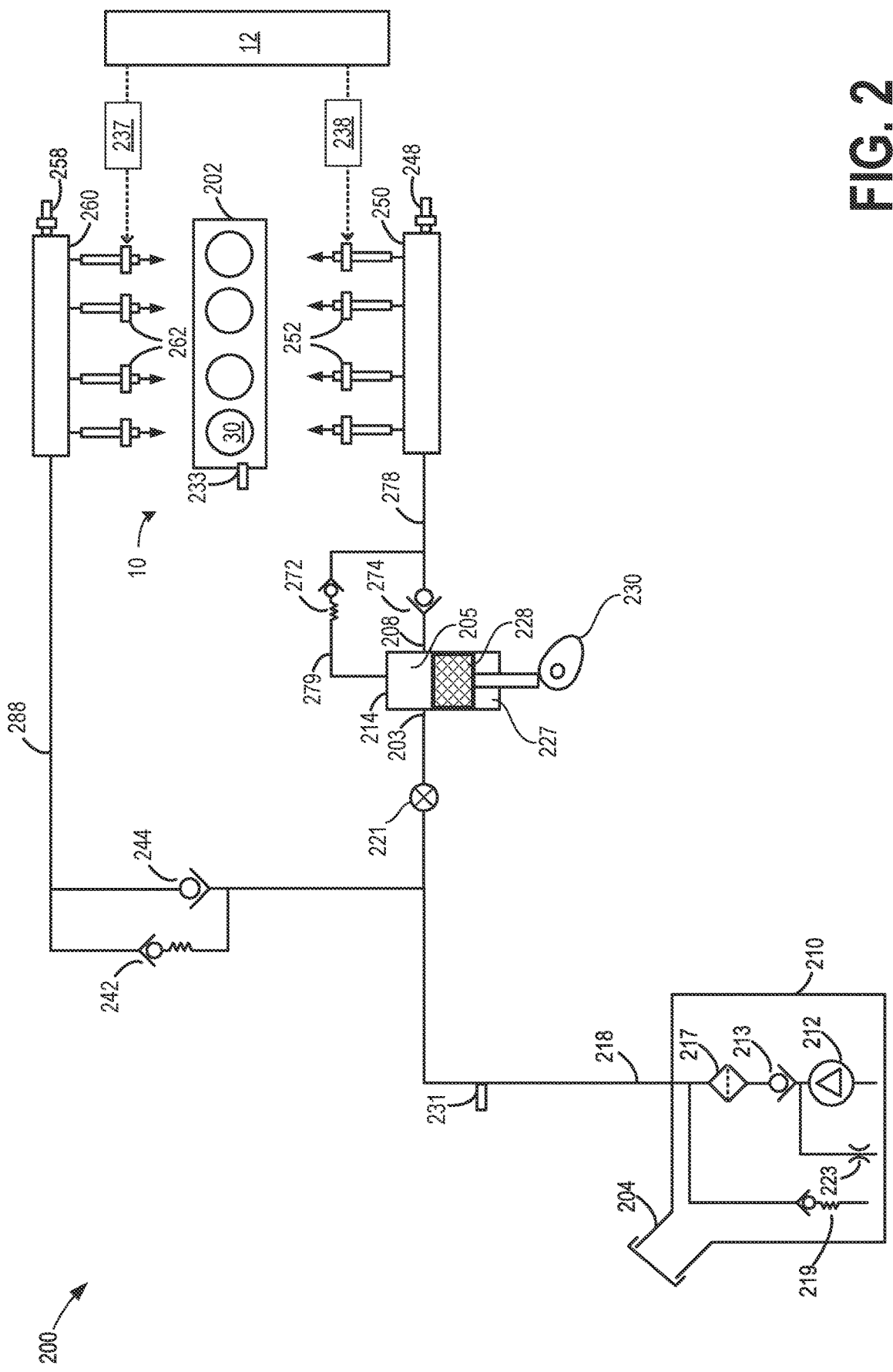
FIG. 2 shows an example fuel system coupled to the engine of FIG. 1.
Figure 3A:
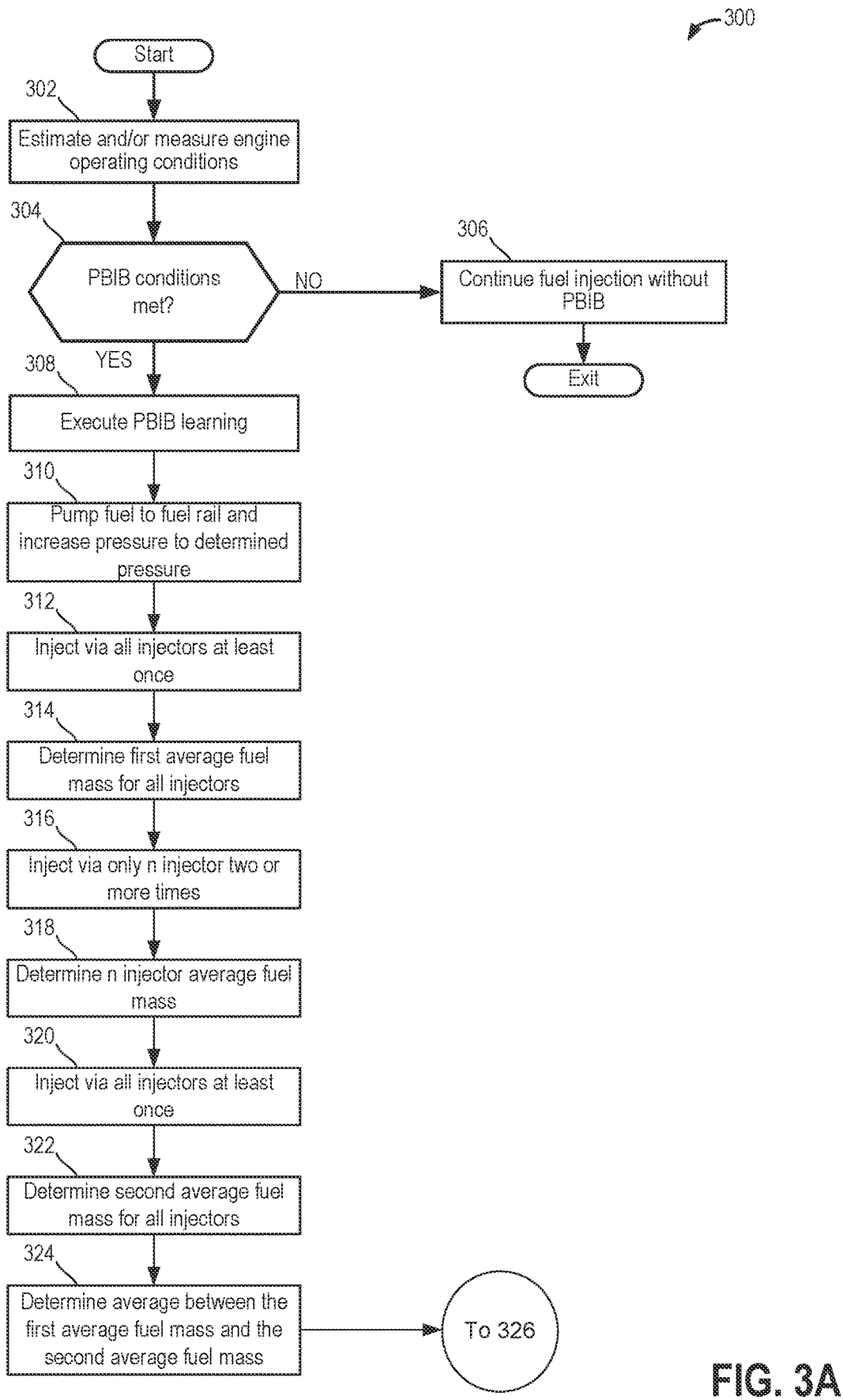
FIGS. 3A and 3B show a method for adjusting a fuel injection pattern during a fuel injector diagnostic.
Figure 3B:
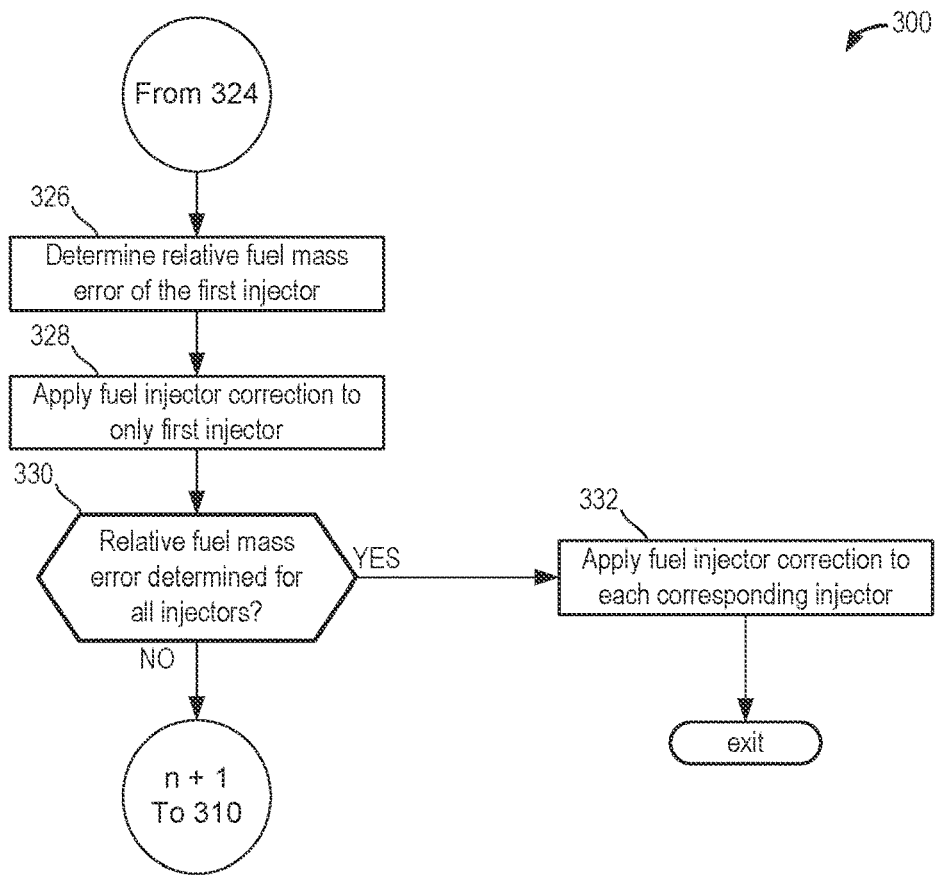
Figure 4:
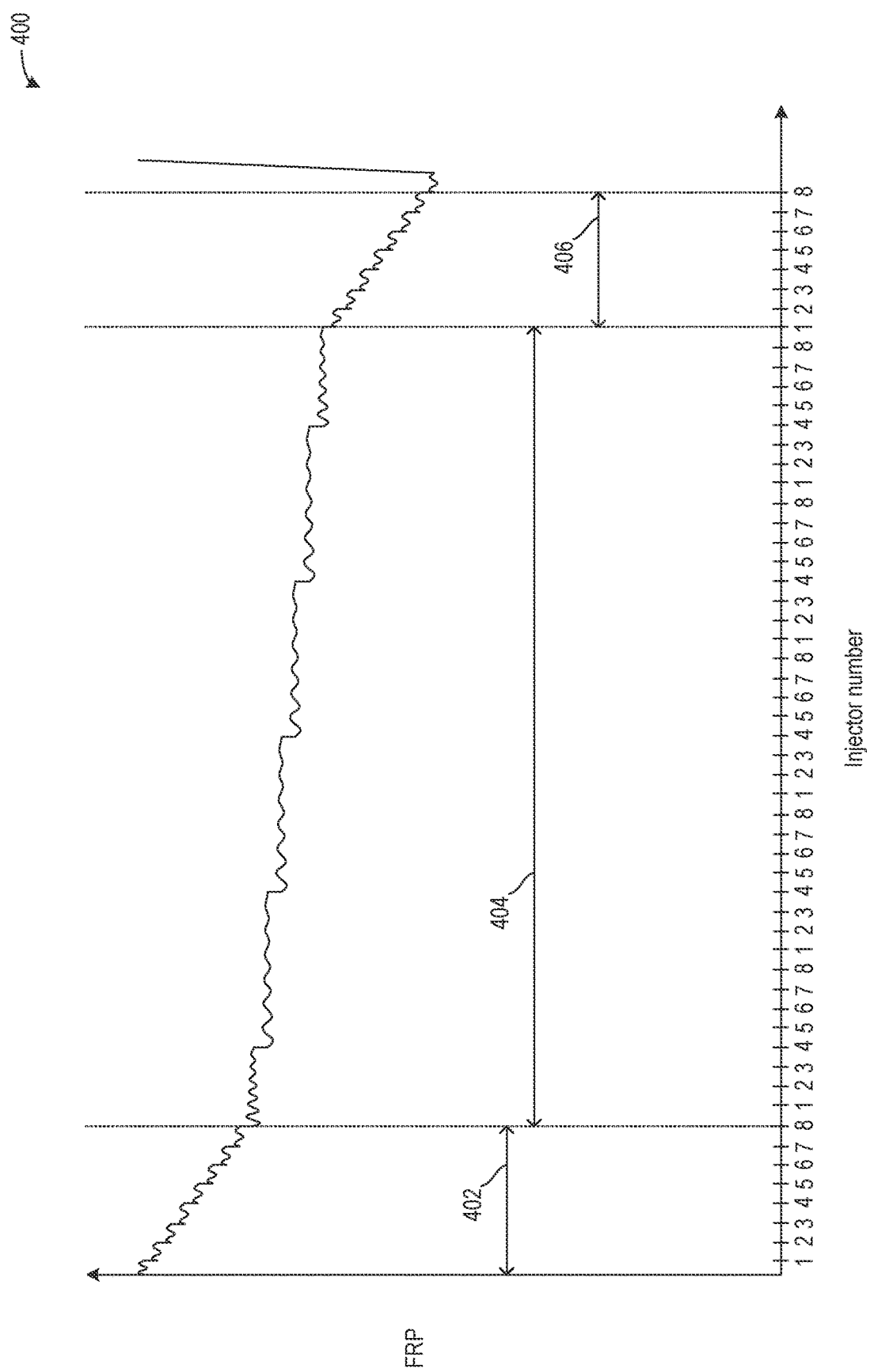
FIG. 4 graphically illustrates a fuel rail pressure (FRP) during a PBIB diagnostic

The following description relates to systems and methods for balancing fuel injectors errors via a pressure-based injector balancing diagnostic. The diagnostic may be executed on one or more of port-fuel injectors and direct injectors. In one example, the diagnostic is executed on only direct injectors. An engine may include a cylinder configured to receive fuel from each of a port-fuel injector and a direct injector, as shown in FIG. 1. The cylinder may be one of a plurality of cylinders of multiple banks of the engine. FIG. 2 shows a single cylinder bank of an engine including multiple cylinder banks along with a fuel system for fueling fuel rails of the port-fuel injectors and the direct injectors. A method for adjusting an injection pattern of one of the direct injectors or the port-fuel injectors during the PBIB diagnostic is shown in FIGS. 3A and 3B. A graphical illustration of the PBIB diagnostic is shown in FIG. 4.

FIG. 1 shows a schematic depiction of a spark ignition internal combustion engine 10 with a dual injector system, where engine 10 is configured with both direct injection and port fuel injection. As such, engine 10 may be referred to as a port-fuel direct inject (PFDI) engine. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 and positioned to directly inject therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. In this example, both direct fuel injector 67 and port fuel injector 66 are shown. However, certain engines may include only one kind of fuel injector such as either direct fuel injector or port fuel injector. Fuel injection to each cylinder may be carried out via direct injectors (in absence of port injectors) or port direct injectors (in absence of direct injectors). An example fuel system including fuel pumps and injectors and fuel rails is elaborated on with reference to FIG. 2.

Returning to FIG. 1, exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 67 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry. Further, controller 12 may be configured to adjust a fuel injection pattern of the fuel injectors 66 and 67 during a pressure-based injector balancing (PBIB) diagnostic. The controller 12 may include instructions that when executed cause the controller 12 to adjust an injection pattern to increase an occurrence of an injection being preceded by a same cylinder bank injection. Thus, the cylinder 30 may be one cylinder of a first cylinder bank, the engine 10 further comprising a second cylinder bank. The controller 12 may be further configured to monitor a fuel rail pressure (FRP) of an inter-injection period during the PBIB diagnostic. In one example, the controller 12 may be configured to learn only FRPs of inter-injection periods for injections preceded by a same-cylinder bank injection while ignoring FRPs for injections preceded by an opposite-cylinder bank injection. Additionally or alternatively, the controller 12 may signal to skip injections from the opposite-cylinder bank, thereby increasing the occurrence of injections being preceded by a same-cylinder bank injection, which may increase a rate in which FRP data is accrued.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 40 of engine 10 and electric machine 53 are connected via a transmission 57 to vehicle wheels 55 when one or more clutches 56 are engaged. In the depicted example, a first clutch 56 is provided between crankshaft 40 and electric machine 53, and a second clutch 56 is provided between electric machine 53 and transmission 57. Controller 12 may send a signal to an actuator of each clutch 56 to engage or disengage the clutch, so as to connect or disconnect crankshaft 40 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 59 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 64, fuel injectors 66 and 67, spark plug 91, etc., to adjust engine operation based on the received signals and instructions stored on a memory of the controller. As one example, the controller may send a pulse width signal to the port injector and/or the direct injector to adjust a timing of fuel injection and an amount of fuel delivered to a cylinder via an injector.

FIG. 2 schematically depicts an example embodiment 200 of a fuel system, such as fuel system 190 of FIG. 1. Fuel system 200 may be operated to deliver fuel to an engine, such as engine 10 of FIG. 1. Fuel system 200 may be operated by a controller to perform some or all of the operations described with reference to the methods of FIGS. 3 and 4. Components previously introduced are similarly numbered in FIG. 2. Engine 10 is shown with cylinder 30 arranged in a cylinder bank 202. The cylinder bank 202 may be one of a plurality of cylinder banks of the engine 10, each of the banks identical in configuration.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 12 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example, the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 200 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a plurality of first injectors). Fuel lifted by the LPP 212 may also be supplied to a second fuel rail 260 coupled to one or more fuel injectors of a second group of port injectors 262 (herein also referred to as a plurality of second injectors). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective pluralities of first and second injectors 252, 262, it will be appreciated that each fuel rail 250, 260 may dispense fuel to any suitable number of fuel injectors. As one example, first fuel rail 250 may dispense fuel to one fuel injector of plurality of first injectors 252 for each cylinder of the engine while second fuel rail 260 may dispense fuel to one fuel injector of the plurality of second injectors 262 for each cylinder of the engine. Controller 12 can individually actuate each of the plurality of second injectors 262 via a port injection driver 237 and actuate each of the plurality of first injectors 252 via a direct injection driver 238. The controller 12, the drivers 237, 238 and other suitable engine system controllers can comprise a control system. While the drivers 237, 238 are shown external to the controller 12, it should be appreciated that in other examples, the controller 12 can include the drivers 237, 238 or can be configured to provide the functionality of the drivers 237, 238.

HPP 214 may be an engine-driven, positive-displacement pump. As one non-limiting example, HPP 214 may be a Bosch HDP5 high pressure pump, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 12. Likewise, second fuel rail 260 includes a second fuel rail pressure sensor 258 for providing an indication of port injection fuel rail pressure to the controller 12. An engine speed sensor 233 (or an engine angular position sensor from which speed is deduced) can be used to provide an indication of engine speed to the controller 12. The indication of engine speed can be used to identify the speed of higher pressure fuel pump 214, since the pump 214 is mechanically driven by the engine, for example, via the crankshaft or camshaft. A solenoid controlled valve 221 may be included on the inlet side of pump 214. This solenoid controlled valve 221 may have two positions, a first pass through position and a second checked position. In the pass through position, no net pumping into the fuel rail 250 occurs. In the checked position, pumping occurs on the compression stroke of plunger/piston 228. This solenoid valve 221 is synchronously controlled with its drive cam to modulate the fuel quantity pumped into fuel rail 250.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more of the pluralities of first and second injectors 252, 262. For example, during high load conditions, fuel may be delivered to a cylinder on a given engine cycle via only direct injection, wherein port injectors 262 are disabled (e.g., not injecting fuel). In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212 and 214 to adjust an amount, pressure, flow rate, etc., of a fuel delivered to the engine. As one example, controller 12 can vary a pressure setting, a pump stroke amount, a pump duty cycle command, and/or fuel flow rate of the fuel pumps to deliver fuel to different locations of the fuel system. A driver (not shown) electronically coupled to controller 12 may be used to send a control signal to the low pressure pump, as required, to adjust the output (e.g., speed, flow output, and/or pressure) of the low pressure pump.

The fuel injectors may have injector-to-injector variability due to manufacturing, as well as due to age. Ideally, for improved fuel economy, injector balancing is desired wherein every cylinder has matching fuel injection amounts for matching fuel delivery commands. By balancing air and fuel injection into all cylinders, engine performance is improved. In particular, fuel injection balancing improves exhaust emission control via effects on exhaust catalyst operation. In addition, fuel injection balancing improves fuel economy because fueling richer or leaner than desired reduces fuel economy and results in an inappropriate ignition timing for the actual fuel-air ratio (relative to the desired ratio). Thus, getting to the intended relative fuel-air ratio has both a primary and secondary effect on maximizing the cylinder energy for the fuel investment.

Fueling errors can have various causes in addition to injector-to-injector variability. These include cylinder-to-cylinder misdistribution, shot-to-shot variation, and transient effects. In the case of injector-to-injector variability, each injector may include a different error between what is commanded to be dispensed and what is actually dispensed. As such, fuel injector balancing may result in an engine's torque evenness. Air and fuel evenness improves emission control.

In one example, during a PBIB diagnostic, one of the plurality of first injectors 252 or the plurality of second injectors 262 may be monitored. In one example, if the plurality of first injectors 252 is being balanced during the PBIB diagnostic, then the pump 214 may be sealed from the first fuel rail 250. Sealing the pump 214 from the first fuel rail 250 may include deactivating the pump 214 and closing a valve. The PBIB diagnostic may further include adjusting an injection timing or an injection pattern of the injectors such that injection overlap does not occur. Additionally or alternatively, the PBIB diagnostic may include modifying an injection pattern following a beginning stage of the diagnostic. The injection pattern may be modified to skip all but one injector. In this way, a FRP change based on injections provided via a single injector may be determined. During the beginning and an end stage, each of the plurality of injectors may inject. The plurality of injectors may be the direct injectors 252 or the port-injectors 262. The FRP change based on injections via the plurality of injectors at the beginning and the end may be determined. An average fuel mass injection may be determined based on a total FRP change divided by a number of injections for each of the beginning stage and the end stage. A total average may be determined based on the two average fuel mass injections, wherein an average fuel mass injection of the single injector may be compared to the total average to determine a relative fuel mass error of the single injector. A fuel injector correction may be applied to the single injector following the PBIB diagnostic. Subsequent PBIB diagnostics may include determining other relative fuel mass errors for other injectors of the plurality of injectors different than the single injector.

In one embodiment, during balancing the amount of fuel injected by a plurality of fuel injectors, a fuel mass error of all the injectors may be learned following a priming of the fuel rail. Priming the fuel rail may include flowing fuel thereto via a fuel pump, wherein the fuel pump is deactivated following priming the fuel rail to allow the FRP to decrease during PBIB. A first average fuel mass of all the injectors may be determined at a start of PBIB with the fuel rail pressure being relatively high. Following at least one injection from each injector, PBIB may include injecting via only a single injector and determining an average fuel mass of the single injector across a threshold number of injections. A second average fuel mass of all the injectors may be determined following the threshold number of injections via the single injector, wherein the second average fuel mass is determined when the FRP is relatively low. The average fuel mass of the single injector may be compared to an average of the first and second average fuel masses to determine a relative fuel mass error of the single injector. PBIB may be repeated until the relative fuel mass error is determined for each of the plurality of injectors. Subsequent engine fueling may be adjusted based on the determined fuel mass errors.

In one example, a method may be executed in combination with the systems of FIGS. 1 and 2. The method may include adjusting a fuel injection pattern during a fuel injector diagnostic to inject fuel from only a single injector while skipping fuel injections from all remaining injectors of a plurality of injectors. The fuel injector diagnostic may be executed via only a single-type of injector. For example, if the fuel injector diagnostic is executed on direct injectors, then port-fuel injectors may be used to meet engine fueling demands while the direct injectors are operated in accordance with the diagnostic parameters. The fueling provided by the port-fuel injectors may account for the fuel injected via the direct injectors during the diagnostic. Additionally or alternatively, the diagnostic may be executed with the port-injectors while the direct injectors meet engine fueling demands. The diagnostic may include a method of computing a fuel injector correction based upon modifying injector commands and a beginning and an end of a diagnostic and computing an average value at the beginning and the end of the diagnostic, where the method includes determining an average mass at a middle of the diagnostic for an individual injector and comparing the average mass to the average value to determine a relative fuel mass error for the individual injector. By doing this, injections from the individual injector span a wide range of various FRPs and FRTs by injecting from the beginning and the end of the diagnostic. The impact of varying pressure and temperature may be minimized and the average fuel mass of the individual injector and the average fuel mass of all the injectors may correspond to a similar average FRP, and therefore to a similar average bulk modulus. Thus, a robust and efficient method for determining a relative fuel mass error of a single injector while accounting for variances in FRP and bulk modulus is provided.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 3, an example method for carrying out pressure based injector balancing for the engine fuel injectors is shown at 300. The method enables the injection volume dispensed by the fuel injector on the given fuel injection event to be accurately determined and used for balancing injector errors. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the method 300 includes estimating and/or measuring engine operating conditions. Engine operating conditions may include but are not limited to one or more of engine speed, torque demand, manifold pressure, manifold air flow, ambient conditions (ambient temperature, pressure, and humidity, for example), engine dilution, exhaust-gas recirculate (EGR flow rate), and the like.

At 304, the method 300 includes determining if pressure based injector balancing (PBIB) conditions are met for the engine fuel injectors (such as direct injectors 252 or port fuel injectors 262 in FIG. 2). PBIB learning may be performed to learn a variation in injector errors. As such, each injector may have an error between the commanded fuel mass to be delivered and the actual fuel mass that was delivered. By learning individual injector errors, the errors may be balanced so that all injectors move towards a common error value. PBIB learning may be performed at selected conditions such as when engine speed is lower than a threshold speed, while injector pulse-width (PW) is lower than a threshold PW, and when multiple injectors are not scheduled to deliver concurrently. At high engine speeds or large fuel pulse-widths the DI injection periods may overlap, thus substantially eliminating an inter-injection period. In one example, the threshold speed and the threshold PW are based on non-zero, positive numbers. When injector overlap occurs, an inter-injection period ceases to exists, thereby disabling any PBIB learning from being performed. If PBIB conditions are not confirmed, then at 306, the method includes continuing fuel injection without performing PBIB.

If conditions are met for carrying out PBIB, then the method 300 may proceed to 308, which includes executing PBIB learning. The PBIB learning may include where only a single injector is active during a middle portion of a sub-portion of the PBIB learning. Parameters of the single injector may be compared to parameters of all the injectors to determine a relative fuel mass error. The PBIB learning is described in greater detail herein. PBIB learning may include modifying injector commands to adjust an injection pattern and/or an injection fueling amount.

At 310, the method 300 may include pumping fuel to the fuel rail and increasing a fuel rail pressure to a determined pressure. The determined pressure may include a pressure corresponding to an amount of fuel sufficient to execute the PBIB learning while maintaining pressures above a lower pressure based on a sensor sensitivity. A controller may signal to an actuator of a fuel pump to flow fuel to the fuel rail, wherein the controller may then signal to the actuator of the fuel pump to deactivate the fuel pump following priming the fuel rail.

At 312, the method 300 may include injecting via all injectors at least once. At a beginning of the PBIB learning, all of the fuel injectors may inject fuel to respective cylinders at least once when the FRP is highest during the PBIB learning. By doing this, parameters of the injectors may be monitoring when fuel rail pressures and temperatures are relatively high.

At 314, the method 300 may include determining a first average fuel mass for all injectors. The first average fuel mass may be equal to an average fuel amount injected by each of the injectors. The first average fuel mass may be determined based on a decrease in FRP across the plurality of injections. For example, if there are eight injectors each injecting fuel once, then the decrease in FRP from an initial FRP to a final FRP is divided by 8 to determine an average fuel mass injection.

At 316, the method 300 may include injecting via only a first injector via adjusting the fuel injection pattern. In one example, the first injector is one of the plurality of injectors. Adjusting the fuel injection pattern and injecting via only the first injector may include skipping injections via the other injectors and signaling to inject via only the first injector. If the plurality of injectors are direct injectors, then port-injectors may deliver an entire desired fuel amount for the cylinders comprising the other injectors that are skipped. The port-injector corresponding to the cylinder comprising the first injector may inject less than the desired fuel amount based on an amount commanded to the first injector to inject during the diagnostic. The first injector may be commanded to inject two or more times. In one example, the first injector may be commanded to inject a threshold number of times, wherein the threshold number of times is based on a desired total pressure change of the fuel rail. The pressure change may be based on the FRP decreasing from a relatively high pressure to a relatively low pressure. The relatively high pressure may correspond to a FRP during the beginning of the diagnostic, such as a pressure from 310 to 312. In one example, the threshold number of times is equal to a number of injectors, such that the FRP change during the beginning, middle, and end is substantially uniform.

At 318, the method 300 may include determining a first injector average fuel mass. The first injector average fuel mass may be based on a total decrease in FRP across the plurality of injections injected by the first injector. For example, if the first injector is commanded to inject five times, then the total decrease in FRP is divided by five to determine the first injector average fuel mass.

At 320, the method 300 may include injecting via all injectors at least once. In one example, all the injectors are commanded to inject fuel at an end of the PBIB learning. As such, no injectors are skipped at a beginning and an end of the PBIB learning. During the middle portion in which only the first injector injects fuel, the other injectors are skipped.

At 322, the method 300 may include determining a second average fuel mass for all the injectors, which may be similar to 314 described above.

At 324, the method 300 may include determining a total average value between the first average fuel mass and the second average fuel mass. The total average value may provide a final average fuel mass for all injectors used to compute a relative correction factor for the first injector. Additionally, the total average value may balance the difference in FRP and FRT temperature at the beginning of the PBIB learning with respect to the first average fuel mass and the end of the PBIB learning with respect to the second average fuel mass.

At 326, the method 300 may include determining a relative fuel mass error of the first injector. The relative fuel mass error may be based on equation 1 below which shows the relative fuel mass error being equal to a ratio of the average fuel mass of a single injector to the total average value.

$$\epsilon = \frac{\text{average fuel mass of first injector}}{\text{total average value}} \quad (1)$$

At 328, the method 300 may include applying fuel injector correction to only the first injector. For example, if the relative fuel mass error is greater than 1, then the first injector may be injecting more fuel than the other injectors. As another example, if the relative fuel mass error is less than 1, then the first injector may be injecting less fuel than the other injectors. If the fuel mass error is substantially equal to 1, then a fuel injector correction may be equal to zero. In one example, if the first injector is injecting too much fuel, then a controller may signal to an actuator of the first injector to inject less fuel based on the fuel injector correction. In one example, the fuel injector correction may correspond to a modified pulse-width (PW) delivered to the actuator of the injector.

In some examples, additionally or alternatively, the fuel injector correction may be applied to the fuel injector with the fuel injector corrections of the other fuel injectors. By doing this, the relative fuel mass error of each of the injectors may be learned before a correction is applied to any of the injectors.

At 330, the method 300 may include determining if a relative fuel mass error is determined for each of the plurality of injectors. If a relative fuel mass error is determined for each of the plurality of injectors, then at 332, the method 300 may exit.

If a relative fuel mass error has not been determined for each of the plurality of injectors the method 300 may include returning to step 310 and executing PBIB for a second injector. As such, the fuel pump may be commanded to prime the fuel rail with fuel. The fuel pump may be deactivated such that the conditions in which the error of the second injector is learned are similar to the conditions of the first injector.

The method 300 may include continuing PBIB until a relative fuel mass error is learned for each of the plurality of injectors. The fuel pump may prime the fuel rail between each batch of the PBIB learning, wherein a batch includes the beginning where all the injectors inject, the middle where only a single injector injects, and the end where all the injectors inject.

The method 300 may include applying a fuel injector correction to each corresponding injector. For example, the first injector may inject more than the total average value and a fourth injector may inject less than the total average value. As such, a controller may command to an actuator of the first injector to inject less fuel based on a corresponding fuel injector correction and to an actuator of the fourth injector to inject more fuel based on its corresponding fuel injector correction.

Thus, in one example, the method for PBIB learning may execute injections from the individual injector across a range of FRP and FRT. The effects of higher FRPs at the beginning may be balanced by lower FRPs at the end of the batch. A first intermediate average fuel mass of all injectors is determined at the beginning with the higher FRP and a second intermediate average fuel mass of all injectors is determined at the end with the lower FRP. In this way, a total average value of all the injectors may also average the FRP. The average fuel mass of the individual injector and the total average value of all injectors correspond to a similar average FRP, and therefore similar average bulk modulus. The impact of variances in FRP and bulk modulus may be cancelled out in the relative fuel mass error.

Turning to FIG. 4, it shows a plot 400 graphically illustrating changes to FRP during a batch of the PBIB learning. As mention above, the batch may include learning the first average fuel mass of all the injectors during a beginning of the PBIB, illustrated by double headed arrow 402. During the beginning, each of the plurality of injectors injects fuel, wherein a total change in FRP is divided by the number of injections. In the example of FIG. 4, the total change is divided by eight.

During a middle of the PBIB learning, indicated by double headed arrow 404 and following the beginning, only one injector may inject fuel. The other injectors are skipped and do not inject fuel. As such, the FRP may not change when the other injectors are skipped. In the example of FIG. 4, injector 4 is the only injector that injects during the middle. A total change in FRP may be divided by the number of injections by injector 4 to determine an average injector 4 fuel mass. In the example of FIG. 4, injector 4 injects five times.

During an end of the PBIB learning, indicated by double headed arrow 406 and following the middle, all the injectors inject fuel. As such, the end may mimic the beginning. A second average fuel mass of all the injectors is learned during the end. As illustrated, the FRP during the end is less than the fuel rail pressure during the beginning. By determining the first and second average fuel masses and determining a total average value based thereon, the FRP change may be cancelled. The average injector 4 fuel mass may be compared to the total average value to determine a relative fuel mass error for only injector 4.

Following the end, a second PBIB learning routine may be executed to learn a relative fuel mass error of another injector different than injector 4. As shown, the FRP increases via a fuel pump priming the fuel rail for the second PBIB learning routine. In some examples, multiple PBIB leaning routines may be executed without priming the fuel rail (e.g., flowing fuel thereto to increase the FRP). This may speed up the learning process and reduce energy consumption.

The disclosure provides support for a method including computing a fuel injector correction based upon modifying injector commands at a beginning and an end of a diagnostic and computing an average value at the beginning and the end of the diagnostic and determining an average mass at a middle of the diagnostic using a rail pressure change and determining a relative fuel mass error for an individual injector. A first example of the method further includes where the average value at the beginning of the diagnostic corresponds to an average amount of fuel injected by the plurality of injectors when the rail pressure is greater than a threshold pressure. A second example of the method, optionally including the first example, further includes where the average value at the end of the diagnostic corresponds to an average amount of fuel injected by the plurality of injectors when the rail pressure is less than a threshold pressure. A third example of the method, optionally including one or more of the previous examples, further includes where the average mass determined at the middle of the diagnostic corresponds to an average amount of fuel injected by the individual injector. A fourth example of the method, optionally including one or more of the previous examples, further includes determining a total mass average based on the average values at the beginning and the end. A fifth example of the method, optionally including one or more of the previous examples, further includes where the relative fuel mass error is based on a ratio of the total average mass and the average mass at the middle of the diagnostic.

The disclosure further provides support for a system including an engine comprising a plurality of cylinders and a controller comprising computer-readable instructions stored on non-transitory memory thereof that enable the controller to determine a relative fuel mass error for one injector based on an average fuel mass injected by the one injector during a middle of a diagnostic compared to a total average fuel mass injected by a plurality of injectors during a beginning and an end of the diagnostic. A first example of the system further includes where the instructions enable the controller to inject fuel via all of the plurality of injectors during the beginning of the diagnostic and determine a first average fuel mass of the plurality of injectors based on a fuel rail pressure change. A second example of the system, optionally including the first example, further includes where the instructions enable the controller to inject fuel via all of the plurality of injectors during the end of the diagnostic and determine a second average fuel mass of the plurality of injectors based on a fuel rail pressure change. A third example of the system, optionally including one or more of the previous examples, further includes where the instructions further enable the controller to deactivate all the injectors except for the injector during the middle of the diagnostic. A fourth example of the system, optionally including one or more of the previous examples, further includes where the instructions further enable the controller to apply a fuel injector correction to the injector based on the relative fuel mass error. A fifth example of the system, optionally including one or more of the previous examples, further includes where the instructions further enable the controller to determine another relative fuel mass error different than the relative fuel mass for another injector different than the injector. A sixth example of the system, optionally including one or more of the previous examples, further includes where a duration of the middle is greater than a duration of the beginning and the end. A seventh example of the system, optionally including one or more of the previous examples, further includes where the instructions further enable the controller to signal to a pump to flow fuel to a fuel rail prior to the beginning of the diagnostic, further comprising deactivating the pump during the diagnostic. An eighth example of the system, optionally including one or more of the previous examples, further includes where the average fuel mass is determined based on a total rail pressure change and a number of injections.

The disclosure further provides support for a method including computing a fuel injector correction based upon modifying injector commands at a beginning and an end of a diagnostic and computing an average value at the beginning and the end of the diagnostic, determining an average mass at a middle of the diagnostic using a rail pressure change of a single injector, determining a total mass average based on the average values at the beginning and the end, and determining a relative fuel mass error based on a ratio of the average mass and the total mass average. A first example of the method further includes where only the single injector injects during the middle. A second example of the method, optionally including the first example, further includes where each of the plurality of injectors injects at least once during the beginning and the end. A third example of the method, optionally including one or more of the previous examples, further includes where the plurality of injectors are port-injectors positioned to inject into intake ports of an engine or direct injectors positioned to directly inject into cylinders of the engine. A fourth example of the method, optionally including one or more of the previous examples, further includes where the fuel injector correction is applied to only the single injector.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
performing a series of injections with a plurality of fuel injectors using modified injector commands at a beginning of a diagnostic and an end of a diagnostic;
computing an average injected mass of the series of injections of the plurality of injectors for each of the beginning and the end of the diagnostic;
performing a series of injections with an individual injector of the plurality of fuel injectors at a middle of the diagnostic using a rail pressure change and determining an average injected mass for the individual injector; and
determining a relative fuel mass error for an individual injector based on the determined average injected mass for the individual injector, the beginning average injected mass, and the end average injected mass.

2. The method of claim 1, wherein the average injected mass at the beginning of the diagnostic corresponds to an average amount of fuel injected by the plurality of injectors when the rail pressure is greater than a threshold pressure.

3. The method of claim 1, wherein the average injected mass at the end of the diagnostic corresponds to an average amount of fuel injected by the plurality of injectors when the rail pressure is less than a threshold pressure.

4. The method of claim 1, further comprising determining a total mass average based on the beginning average injected mass and the end average injected mass.

5. The method of claim 1, wherein the relative fuel mass error is a ratio of the average injected mass for the individual injector and a total mass average, the total mass average being an average of the beginning average injected mass and the end average injected mass.

6. The method of claim 1, wherein a fuel rail is primed with an initial pressure prior to the beginning injections and the pump is deactivated during the diagnostic such that each injection decreases fuel rail pressure.

7. A system, comprising:
an engine comprising a plurality of cylinders; and
a controller comprising computer-readable instructions stored on non-transitory memory thereof that enable the controller to perform a diagnostic comprising:
performing a series of injections with a plurality of fuel injectors;
determining a beginning average injected mass based on injections at the beginning of the diagnostic and determining an end average injected mass based on injections at the end of the diagnostic;
performing a series of injections with a single injector of the plurality of fuel injectors;
determining an average injected mass based on the injections of the single injector;
determine a relative fuel mass error for the single injector based on the average injected mass of the single injector compared to a total average fuel mass injected based on the beginning average injected mass and the end average injected mass.

8. The system of claim 7, wherein the beginning average injected mass is based on a fuel rail pressure change.

9. The system of claim 8, wherein the end average injected mass is based on a fuel rail pressure change.

10. The system of claim 7, wherein the instructions further enable the controller to apply a fuel injector correction to the single injector based on the relative fuel mass error.

11. The system of claim 7, wherein the instructions further enable the controller to determine a second relative fuel mass error for a second injector and the second relative fuel mass error being different from the relative fuel mass error the single injector.

12. The system of claim 7, wherein a duration of the injections during the middle of the diagnostic is greater than a duration of the injections during the beginning and the end of the diagnostic.

13. The system of claim 7, wherein the instructions further enable the controller to signal a pump to flow fuel to a fuel rail prior to the beginning of the diagnostic and deactivate the pump during the diagnostic.

14. The method of claim 13, wherein deactivating the pump seals a fuel rail such that each injection decreases fuel rail pressure.

15. The system of claim 7, wherein the average injected mass is determined based on a total rail pressure change and a number of injections.

16. A method, comprising:
performing a series of injections with a plurality of fuel injectors using modified injector commands at a beginning and an end of a diagnostic and computing an average injected mass of the series of injections for the plurality of injectors for each of the beginning and the end of the diagnostic;
performing a series of injections with a single injector of the plurality of fuel injectors at a middle of the diagnostic using a rail pressure change and determining an average injected mass for the single injector;
determining a total injected mass average based on each of the beginning average injected mass and the end average injected mass;
determining a relative fuel mass error based on a ratio of the average injected mass for the single injector and the total injected mass average; and
apply a correction to the single injector based on the determined relative fuel mass error.

17. The method of claim 16, wherein only the single injector injects during the middle.

18. The method of claim 16, wherein the plurality of injectors are port-injectors positioned to inject into intake ports of an engine or direct injectors positioned to directly inject into cylinders of the engine.

19. The method of claim 16, wherein a fuel rail is primed with an initial pressure and then a pump is deactivated during the diagnostic such that each injection decreases fuel rail pressure, then the series of injections corresponding to determining the beginning average injected mass are performed, then one or more series of injections corresponding to determining an average injected mass for one or more single injectors are performed, and then the series of injections corresponding to determining the end average injected mass are performed before the pump is reactivated.

20. The method of claim 19, wherein the other injectors are disabled during the series of injections corresponding to determining the average injected mass of a single injector.

* * * * *